April 14, 1970 M. A. SLOATE 3,506,786
MEANS FOR SYNCHRONIZING FRAME AND BIT RATES
OF A RECEIVED SIGNAL WITH A RECEIVER
Filed Oct. 9, 1967 2 Sheets-Sheet 1

INVENTOR.
MARK A. SLOATE
BY Donald W. Phillips
ATTORNEY

INVENTOR.
MARK A. SLOATE
BY Donald W. Phillips
ATTORNEY

United States Patent Office 3,506,786

Patented Apr. 14, 1970

3,506,786

MEANS FOR SYNCHRONIZING FRAME AND BIT RATES OF A RECEIVED SIGNAL WITH A RECEIVER

Mark A. Sloate, Costa Mesa, Calif., assignor to Collins Radio Company, Cedar Rapids, Iowa, a corporation of Iowa Filed Oct. 9, 1967, Ser. No. 673,669

Int. Cl. H04n 5/04

U.S. Cl. 178—69.5 6 Claims

ABSTRACT OF THE DISCLOSURE

Means for synchronizing the frame and bit rates of a received signal with the frame and bit rates of a receiver comprising a shift register to which the received data bits are supplied. First and second counter are each advanced one count by each received bit and are alternately reset to zero by successively received frame synchronizing pulses so that the counters keep track of bits received in alternately occurring frames. The counter keeping track of a given received frame has its output connected to the matrix by the next received frame synchronizing pulse. Said matrix means responds to the count of said connected counter to address the corresponding shift register stage and supply the bit stored therein through the matrix to a gating means at the output thereof. Each receiver bit synchronizing pulse decrements the connected counter by one and also opens said gating means to pass the data to a receiver means. Thus the connected counter count always corresponds to that shift register stage containing the next bit to be transferred therefrom.

This invention relates generally to means for receiving transmitted data in which there has been a propagation delay and, more specifically, to a simplified buffer storage means which compensates for the propagation delay of the transmission media to provide both frame and bit synchronization of the received transmitted signal with that of the receiver.

In the transmission of data to a receiver, two distinct problems of synchronization are likely to occur. The first problem relates to frame synchronization. More specifically, the propagation delay over the transmission path can cause the frames of data to arrive at the receiving end of the path out of synchronization with a fixed time clock at the receiver. The second problem involves bit synchronization. Under some data transmission systems the bit rate of the receiver is different from the bit rate of the transmitted words. In those cases where the bit rate at the receiver is lower than the bit rate of the transmitted words, it is possible to transmit words with an increased time interval between the words (or frames) so that the frame rate of the transmitted words is equal to the frame rate of the time clock at the receiver. The transmitted word can then be reformed with a new bit rate equal to the bit rate of the receiver. A third problem can arise when both the frame synchronization and the bit synchronization of the received transmitted word are not suitable for direct reception by the receiver.

In the prior art the above-mentioned problems of synchronizing both the frame rate and the bit rate of the receiver signal to the receiver is usually accomplished by some type of buffer storage. One of the more common types of buffer storage involves the use of magnetic cores with a plurality of address locations therein. The received words are stored in the various address locations of the magnetic core buffer storage means, and then at the appropriate time, both with respect to frame synchronization and to bit synchronization, are re-transmitted to the receiver, which may be data processing equipment. Other types of buffer storage memories include circulating memories which can receive information from peripheral devices, such as teletypewriters, at a relatively slow rate and then periodically deliver the teletypewriter codes to a data processor at the much faster bit rate of the data processor, and with the proper frame synchronization. For a more complete description of this type buffer storage memory, reference is made to co-pending U.S. application, Ser. No. 434,964, filed Feb. 24, 1965, by Robert J. Hirvela now issued as Patent No. 3,350,697 and entitled "TTY Character Assembler," and co-pending U.S. application, Ser. No. 519,732, filed Jan. 10, 1966, by William M. Hutchinson and William J. Melvin and entitled "Glass Delay Line Recirculating Memory" now issued as Patent No. 3,432,-816 and both of which are assigned to the same assignee as the present invention.

Although the above-mentioned prior art devices have proven quite satisfactory in handling incoming data and outgoing data with respect to frame and bit synchronization, and also with respect to storage over longer periods of time, they are nevertheless quite expensive and relatively complex. As indicated above, they are designed to handle buffer storage requirements of time intervals exceeding a frame length. More specifically, they are designed to handle the rather large differences between the frame and bit times of peripheral devices and the frame and bit times of a data processor, for example. There is a need in the prior art for a buffer storage device of a somewhat lesser capacity which is capable of handling frame and bit synchronization problems between the received transmitted data and the frame and bit timing of the receiver when the time differences in synchronization are relatively small, as for example, those frame synchronization problems arising from propagation delay, and those problems involved in changing the bit rate of received words, when the frame rate of transmitter and receiver are the same.

It is the primary object of this invention to provide a means for maintaining synchronization between the received data and the receiver by inserting a variable delay between the received information and said receiver, which delay means automatically adjusts itself to compensate for the varying propagation delay.

Another purpose of the invention is to provide a means for transmitting the bit rate of the received signal to the bit rate of said receiver when the frame rates of the received signal and the receiver are the same.

It is a third object of the invention to provide a means for synchronizing both the frame rate and the bit rate of a received signal with the frame rate and the bit rate of the receiver when the frame rates of the received signal and the receiver are the same.

A fourth purpose of the invention is to provide a simple and relatively inexpensive buffer storage means for synchronizing the frame rate of a received signal with that of the receiver and/or for changing the bit rate of the received signal to that of the receiver when the frame rate of the received signal and the receiver are the same but nonsynchronous.

A further purpose of the invention is the improvement of buffer storage type synchronizing means generally.

In accordance with the invention there is provided a shift register means into which the received data is supplied in serial form. A matrix means functions, under the control of counter means, to selectively connect any stage of the shift register to an output means. Said counter means consist of first and second counter means, both of which respond to each received bit to advance one count, with alternate ones of the counters being reset to zero by successively occurring frame synchronizing pulses of the received signal. The matrix is caused to be alternately under the control of the first and second counters in response to successively occurring frame synchronizing pulses of the receiver.

Thus the first counter #1 might be reset to zero by the received signal synchronizing frame pulse preceding a frame #1 and then begin counting the received bits of said frame #1, which bits are also being supplied into the shift register. The count of counter #1 is advanced one count for each received bit and thereby indicates the shift register stage to which the first received bit has advanced. At some time during the reception of frame #1 the receiver indicates that it is ready to receive frame #1 by the occurrence of a receiver frame synchronizing pulse, which functions by gating means, to connect the output of counter #1 to the matrix means. Thereafter the first receiver bit synchronizing pulse will function to conduct the first received bit of frame #1 from the matrix-accessed stage of the shift register to the said output means, and will decrement the count of counter #1 by one. Counter #1 will now contain a count indicative of the shift register stage containing the second received bit. When said second received bit is advanced to the next stage of the shift register by the reception of another received bit, the count in counter #1 will also be advanced by one.

Before all the bits of frame #1 are transferred from the shift register to the receiver, frame #2 arrives. At the beginning of the reception of frame #2, counter #2 is reset to zero by the received frame synchronizing pulse preceding frame #2 in preparation for counting the number of data bits received in frame #2. It is to be noted that it is necessary that each received data bit of frame #2 also functions to advance the count of counter #1 since the received data bits of frame #2, as they are entered into the shift register, will advance those data bits of frame #1 which are still in the shift register.

After completion of the transfer of all the bits of frame #1 from the shift register to the receiver, under control of counter #1, the next receiver frame synchronizing pulse will occur to place the matrix under control of counter #2 for the transfer of the bits of frame #2 from the shift register to the receiver.

Upon reception of the third frame (frame #3), counter #1 is again reset to zero and the cycle begins again.

The above-mentioned and other objects and features will be more fully understood from the following detailed description thereof when read in conjunction with the drawings in which.

Figure 1:
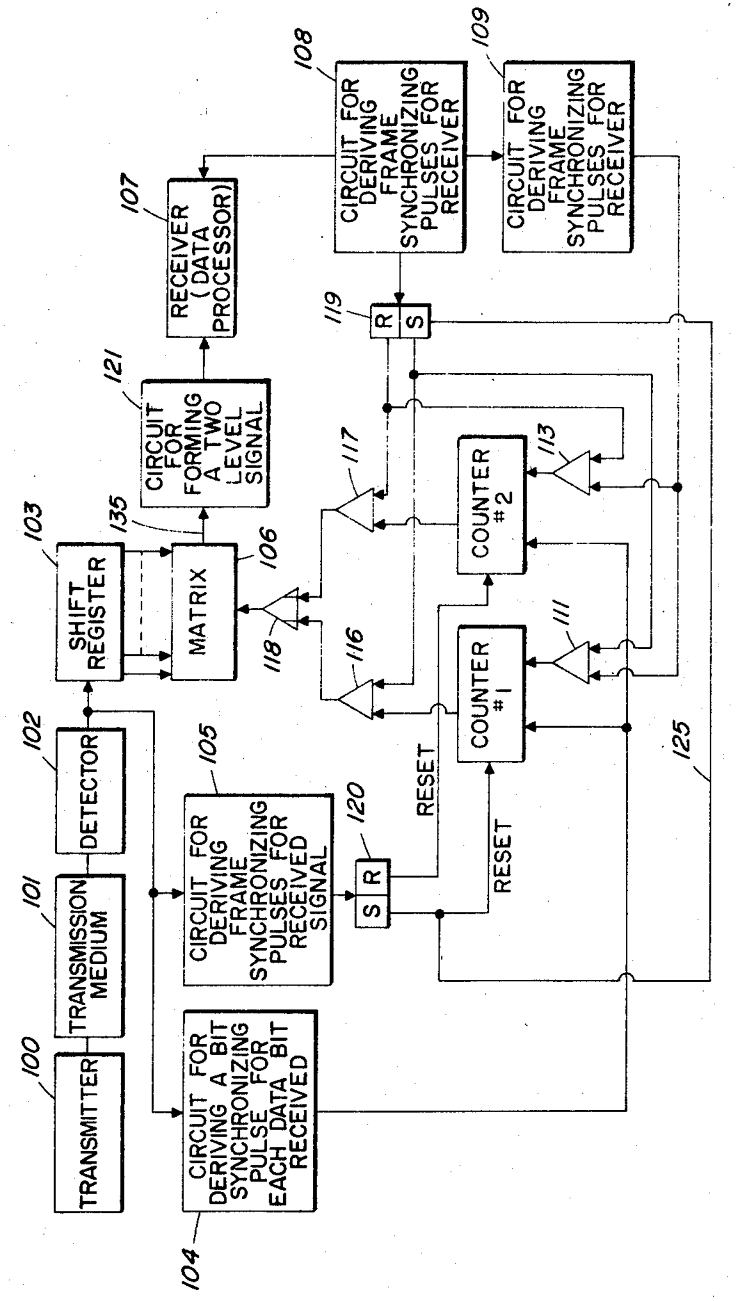
FIG. 1 is a block diagram of the basic form of the invention.
Figure 2:
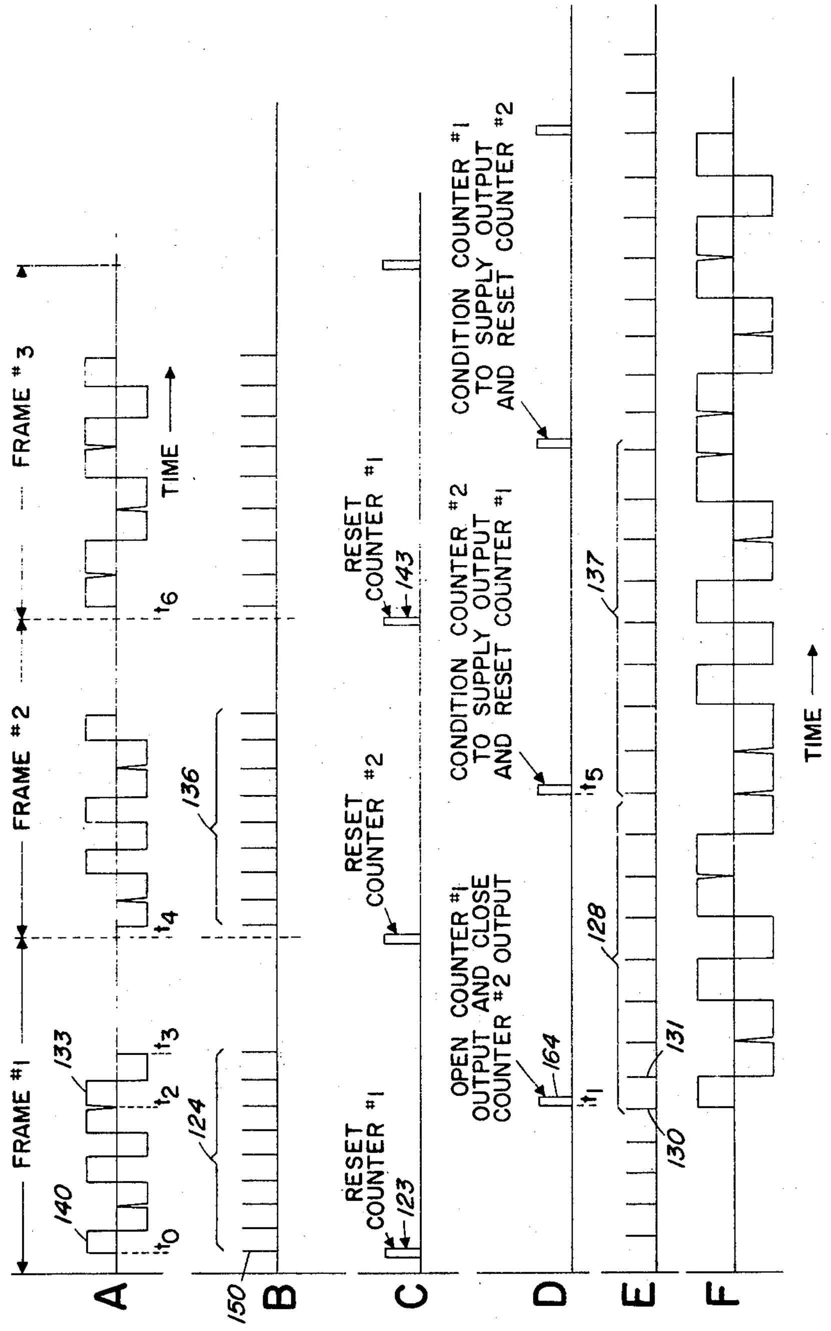
FIG. 2 shows a set of waveforms to facilitate the explanation of the operation of the structure shown in FIG. 1.

Referring now to FIG. 1, the signal received from transmitter 100 is a train of data pulses, serially transmitted and divided into frames which are time synchronous. Such a signal is transmitted through a transmission medium 101 to a detector 102 which functions to detect and shape the received signal into a waveform similar to that shown in FIG. 2A. It can be seen that each frame period of FIG. 2A consists of two sections; one section comprising the received 8-bit word and occupying the time period $t_0$–$t_3$ and the other section occupying the time interval $t_3$–$t_4$ in which no bits are received. The waveform of FIG. 2B represents the bit indicating pulses derived by the circuit 105 of FIG. 1 and the waveform of FIG. 2C represents the frame synchronization pulses of the received signal derived by the circuit of block 106. It is to be noted that for each data bit received, a single data bit indicating pulse of FIG. 2B is generated. For example, for data bit 140 of FIG. 2A there is generated a single data bit indicating pulse 150 of FIG. 2B. During time interval $t_3$–$t_4$, for example, when no data bits are being received, no data bit indicating pulses are generated.

The waveform of FIG. 2D represents the frame synchronizing pulses of the receiver, which pulses are generated by frame synchronizing generating source 108. The train of pulses of FIG. 2E represents the bit synchronization pulses of the receiver which are generated by circuit 109. FIG. 2F represents the two-level signal formed by block 121 of FIG. 1 in response to the output of the matrix 104; said two-level signal of FIG. 2F being supplied to the receiver data processor 107.

In FIG. 1 the operation is as follows. The input signal of frame #1, shown in FIG. 2A, is supplied to shift register 103. Immediately before, the frame synchronizing pulse 123 of FIG. 2C, generated by block 106, is supplied to flip-flop 120 to cause it to assume its set state R, thereby resetting counter #1 to zero. The group of bit indicating pulses 124 of FIG. 2B, which are derived from block 105 of FIG. 1, are supplied to counter #1 which functions to count said pulses. Said bit indicating pulses are also supplied to counter #2 to cause counting therein for reasons that will become clearer when the reception of frame #2 of FIG. 2A is discussed.

At some point in time during reception of frame #1 the receiver data processor 107 begins to receive the incoming frame, said point in time being determined by the occurrence of frame synchronizing pulse 164 from circuit 108. The synchronizing pulse 164 shown in FIG. 2D, functions to set flip-flop 119, thereby opening AND gate 116. Opening of AND gate 116 allows the passing of the output of counter #1 therethrough and then through OR gate 118 to matrix 104; thus establishing a path from the accessed stage of shift register 103 to circuit 121.

The matrix 104 is constructed to respond to the existing count of counter #1 when AND gate 116 is opened, (or counter #2 when AND gate 117 is opened) to connect the corresponding stage of shift register 103 to the output terminal 135 of matrix 104. Thus if counter #1 contains a count of four and AND gate 116 is opened, the data bit appearing in stage four of shift register 103 will be conducted through matrix 104 to output terminal 135.

The setting of flip-flop 119 also performs several other functions. Firstly, it closes AND gate 117 to block the output of counter #2 from matrix 106 and, secondly, it conditions AND gate 111 to pass receiver bit synchronizing signal generating means 109 to counter #1 to decrement said counter #1 by a count of one for each receiver bit synchronizing pulse supplied thereto. Thirdly, the setting of flip-flop 119 closes AND gate 113 to prevent decrementing of said AND gate 113 at this time.

It is to be noted that the state of flip-flop 119 is controlled by the state of flip-flop 120 for synchronizing purposes. More specifically, lead 125 from the set input of flip-flop 120 is supplied to the set control input of flip-flop 119 so that when flip-flop 120 is in its set state the following pulse supplied from block 108 to flip-flop 119 will cause flip-flop 119 to go to its set state. Conversely, when flip-flop 120 is in its reset state, flip-flop 119 must also go to its reset state when a pulse is supplied thereto from frame synchronizing circuit 108. Thus at time $t_1$ in FIG. 2D flip-flop 119 is changed to its set condition, thereby opening AND gate 116, as discussed above. At the same time AND gate 117 is closed so that the output of counter #2 is blocked from entering matrix 104.

Returning again to the operation of counter #1 at time $t_1$, the group of bit synchronizing pulses 128 (FIG. 2E) generated by bit synchronizing generator 109 are supplied to counter #1 and decrement the count therein. The adding of counts to counter #1 by bit indicating pulses 124 from source 105 and the decrementing of the count of counter #1 by the bit synchronizing pulses 128 supplied through AND gate 111 functions to change the addressing of shift register 103 through matrix 104 in the manner discussed generally above.

More specifically, assume as shown in FIG. 2A that six bits had entered the shift register as of time $t_1$ when frame synchronizing pulse 164 (FIG. 2D) occurred. At this time counter #1 was at count 6 and the sixth bit position (stage) of shift register 103 was connected through matrix 104 to two-level signal forming circuit 121. The first pulse 130 of the group of pulses 128 of FIG. 2E then functions to transfer the bit in bit position six of shift register 103 (corresponding to bit 140 in FIG. 2A) to the two-level signal forming circuit 121 in the manner described above. Counter #1 thereupon is decremented by a count of one from the count of six to the count of five so that the fifth bit position of shift register 103 is then addressed by matrix 104.

At time $t_2$ the next received bit 133 is entered into the input of shift register 103, as shown in FIG. 2A, which bit functions to advance the bit 141 in FIG. 2A from the fifth stage to the sixth stage of shift register 103 and also to change the count of counter #1 from five to six. Shortly thereafter, bit synchronizing pulse 131 of FIG. 2E is generated by circuit 109 to decrement counter #1 by one, and also to transfer the bit in the sixth position of shift register 103 through matrix 104 to the two-level signal forming circuit 121.

The next bit to be received is bit 151 of FIG. 2A which advances the bit 156 of FIG. 2A to the sixth stage of shift register 103 and the count in counter #1 from five to six. Shortly thereafter the next receiver bit synchronizing pulse 152 occurs which transfers the bit 156 of FIG. 2A from the sixth position of the shift register through matrix 135 to output terminal 135, and also decrements the count of counter #1 from six to five.

In frame #1 no additional bits are received so that next two receiver bit synchronizing pulses 153 and 154 of FIG. 2E function to transfer the bits 157 and 158 stages five and four of the shift register to the output means 135 thereof.

At time $t_4$ the bits from frame #2 (FIG. 2A) begin to enter the shift register and function to advance the remaining bits 159, 133, and 151 of FIG. 2A, which occupy stages three, two, and one, respectively, of the shift register. However, each time the remaining bits of frame #1 are advanced in the shift register by the bits of frame #2, the count of counter #1 will also be advanced so as to continuously maintain the count corresponding to the shift register stage containing the data bit frame #1 which is to be transferred therefrom at the occurrence of the next received bit synchronizing pulse.

Thus the occurrence of bit 162 will advance the bit 159 from the third to the fourth stage of the shift register, but will also produce a bit indicating pulse 164 of FIG. 2B which will advance the count of counter #1 from three to four. Consequently, when the next occurring receiver bit synchronizing pulse 155 (FIG. 2D) occurs, the data bit 159 stored in the fourth stage of the shift register will be transferred therefrom through the matrix 104 to the output thereof. At the same time the count in counter #1 will be decremented by one.

The occurrence of the received frame synchronizing pulse 166 at time $t_4$ also functions to reset flip-flop 120, thereby resetting counter #2 to zero in preparation for the counting of the bit indicating pulses 136 of FIG. 2B.

It is to be noted that the transfer of the bit from shift register 103 through matrix 104 to circuit 121 occurs during the transition of the count of counter #1 from a given count to the next lower count during the decrementing function. More specifically, when the counter #1 is decremented, the transfer of information from the accessed stage of shift register 103 to matrix 104 occurs. The specific circuitry for performing this function at the transition time is not specifically shown but is well within the scope of those skilled in the art.

At the same time the bit indicating pulses 124 of FIG. 2B were being supplied to counter #1, they were also being supplied to counter #2 to cause its count advance.

As discussed above, the supplying of all bit indicating pulses of FIG. 2B to both counters is necessary in order to enable both counters to maintain proper identification of the data bit advancement in the shift register with respect to the particular frame each counter is supervising.

At time $t_5$ the next receiver frame synchronizing pulse is generated by circuit 108 of FIG. 1 to reset flip-flop 119, thereby energizing AND gate 117 and closing AND gate 116. Resetting of flip-flop 119 further functions to open AND gate 113 and close AND gate 111, thereby preparing counter #2 to be decremented by the group of pulses 137 of FIG. 2E which follow. On the other hand, the group of bit synchronizing pulses 136 of FIG. 2B, generated by block 105, function to add counts to counter #2 in the same manner as described in connection with the operation of counter #1 during the reception of frame #1.

At time $t_6$ the next received signal frame pulse 143 is derived from the incoming signal by circuit 106, and the cycle for the reception of frame #3 of FIG. 2A begins.

It is to be noted that the form of the invention shown and described herein is but a preferred embodiment thereof and that various changes can be made in the logic arrangement without departing from the spirit or scope thereof.

I claim:

1. Means for synchronizing the frame rate and the bit rate of a received signal with the frame rate and the data bit rate of the receiver when the frame rates of the received signal and the receiver are the same but not synchronized, and when the data bit rates of the received signal and the receiver are not the same, and comprising:

shift register means having a plurality of stages for receiving the data bits of said received signal;

first and second counting means each having output signals indicative of the count contained therein;

first and second generating means for generating frame and bit synchronizing signals, respectively, for said received signal;

third and fourth generating means for generating frame and bit synchronizing signals, respectively, for said receiver;

matrix means;

logic means for alternately supplying the output signals of said first and second counting means to said matrix in response to consecutive frame synchronizing pulses of said receiver;

said first and second counting means alternately responsive to consecutive pulses of said received signal frame synchronizing pulses to be reset to zero;

means for advancing both said first and second counting means by a count of one in response to each data bit supplied to said shift register means; and means for decrementing the counter which is connected to said matrix by a count of one in response to each data bit synchronizing pulse of said receiver;

said matrix constructed to respond to the count of the counter supplied thereto to connect the corresponding stage of said shift register to said receiver.

2. Means for synchronizing the frame rate and the bit rate of a received signal with the frame rate and the bit rate of the receiver when the frame rates of the received signal and the receiver are the same but not synchronous and when the bit rates of the received signal and the receiver are not the same, and comprising:

shift register means having a plurality of stages;

first signal generating means for generating a data bit indicating pulse for each received data bit;

first and second counting means each having an output signal indicative of the count contained therein and each responsive to each of said data bit indicating pulses to advance by one the count therein;

second signal generating means for recovering the frame synchronizing signal of said received signal;

third and fourth signal generating means for generating frame and bit synchronizing pulses, respectively, for said receiver;

matrix means constructed to be selectively energized to connect predetermined stages of said shift register means to said receiver;

first logic means for alternately connecting the outputs of said first and second counting means to said matrix means to selectively energize said matrix means, upon the occurrence of successive receiver frame pulses, and to decrement the connected counter in response to each receiver bit synchronizing pulse; and second logic means responsive to consecutive pulses of said received frame synchronizing pulses to alternately reset said first and second counting means to a predetermined reference count.

3. Means for synchronizing the frame and bit rates of a received signal with the frame and bit rates of the receiver when the frame rates of the received signal and the receiver are the same but not synchronous and when the bit rates of the received signal and the receiver are not the same, and comprising:

shift register means having a plurality of stages;

first signal generating means for generating a data bit indicating pulse for each received data bit;

first and second counting means and each having count indicating output signal means and each responsive to each data bit indicating pulse to advance by one the count therein;

second signal generating means for generating the received signal frame synchronizing signal;

third and fourth signal generating means for generating frame and bit synchronizing pulses for said receiver;

matrix means responsive to said counting means output to connect selectable stages of said shift register to said receiver;

first logic means for alternately connecting the outputs of said first and second counting means to said matrix means upon the occurrence of successive receiver frame pulses, and for decrementing the connected counter in response to each receiver bit synchronizing pulse; and second logic means responsive to the consecutive pulses of said received frame synchronizing pulses to alternately reset said first and second counting means to a predetermined reference count.

4. Means for synchronizing the frame and bit rates of a received signal with the frame and bit rates of the receiver when the frame rates of the received signal and the receiver are the same but not synchronous and when the bit rates of the received signal and the receiver are not the same, and comprising:

shift register means having a plurality of stages;

first signal generating means for generating a data bit indicating pulse for each received data bit and for generating the frame synchronizing pulses of said received signal;

first and second counting means each having output means and constructed to advance one count in response to each data bit indicating pulse and to be reset to zero in response to alternate ones of said frame synchronizing pulses;

matrix means having output means and constructed, when selectively energized, to connect selected stages of said shift register to said output means; and logic means responsive to consecutive frame synchronizing pulses of said receiver to alternately connect the output means of said first and second counting means to said matrix means to energize said matrix means to connect selected stages of said shift register means to said output means in accordance with the count in said connected counting means;

said logic means further constructed to supply successive frames of the receiver bit synchronizing pulses to the counting means connected to said matrix means.

said counting means constructed to decrement the count therein by one in response to each receiver bit synchronizing pulse.

5. Means for synchronizing the frame and bit rates of a received signal with the frame and bit rates of the receiver when the frame rates of the received signal and the receiver are the same but not synchronous and when the bit rates of the received signal and the receiver are not the same, and comprising:

shift register means having a plurality of stages;

first signal generating means for generating a data bit indicating pulse for each received data bit;

second signal generating means for generating frame and bit synchronizing pulses for said receiver;

first and second counting means each having count indicating output signal means, each responsive to each data bit indicating pulse to advance by one the count therein, and each responsive to the receiver bit synchronizing pulses, when supplied thereto, to be decremented thereby by a count of one;

matrix means responsive to said counting means to connect selectable stages of said shift register to said receiver;

first logic means for alternately connecting the output signal means of said first and second counting means to said matrix means and for supplying the receiver bit synchronizing pulses to the connected counting means upon the occurrence of successive receiver frame synchronizing pulses; and second logic means responsive to consecutive pulses of said received frame synchronizing pulses to alternately reset said first and second counting means to a predetermined reference count.

6. Means for synchronizing the frame and bit rates of a received signal with the frame and bit rates of the receiver when the frame rates of the received signal and the receiver are the same but not synchronous and when the bit rates of the received signal and the receiver are not the same, and comprising:

shift register means having a plurality of stages;

signal generating means for generating a data bit indicating pulse for each received data bit, the frame synchronizing pulses of said received signal, the bit synchronizing pulses of the receiver, and the frame synchronizing pulses of the receiver;

first and second counting means each having count indicating output signal means, each responsive to the data bit indicating pulses to advance the count therein, each responsive to the receiver bit synchronizing pulses, when supplied thereto, to decrement the count therein, and alternately responsive to successive received signal frame synchronizing pulses to be reset to a predetermined reference count;

mtarix means responsive to said output to connect selectable stages of said shift register to said receiver; and first logic means for alternately connecting the outputs of said first and second counting means to said matrix means and for supplying the receiver bit synchronizing pulses to the connected counting means upon the occurrence of successive receiver frame pulses.

References Cited

UNITED STATES PATENTS 3,185,963 5/1965 Peterson et al. ------ 178—69.5

ROBERT L. GRIFFIN, Primary Examiner

A. H. HANDAL, Assistant Examiner

U.S. Cl. X.R.

328—72, 179